Figure 1:
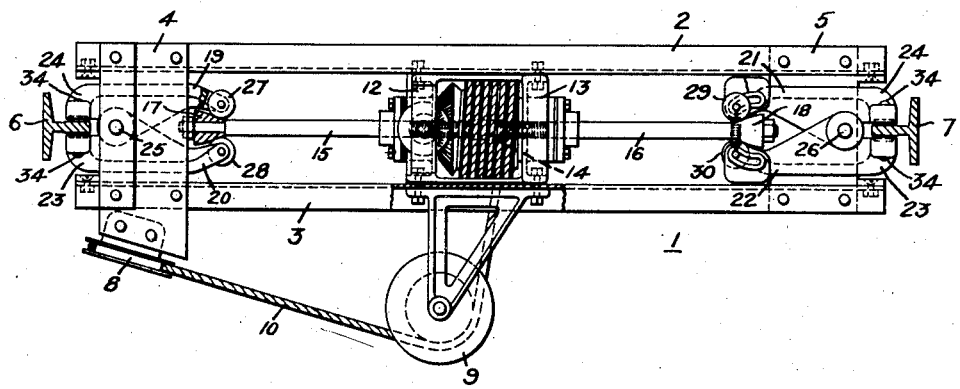

Sept. 29, 1931. G. A. HALFVARSON 1,825,269
SAFETY DEVICE FOR ELEVATORS
Filed July 21, 1928

INVENTOR
Gustaf A. Halfvarson.
BY
ATTORNEY

Patented Sept. 29, 1931

1,825,269

UNITED STATES PATENT OFFICE

GUSTAF A. HALFVARSON, OF OAKMONT, PENNSYLVANIA, ASSIGNOR TO WESTINGHOUSE ELECTRIC & MANUFACTURING COMPANY, A CORPORATION OF PENNSYLVANIA

SAFETY DEVICE FOR ELEVATORS

Application filed July 21, 1928. Serial No. 294,392.

My invention relates to safety devices for elevators and more particularly to safety devices for engaging the guide rails at the sides of the hatchway when the elevator car falls.

Heretofore, it has been customary to provide the safety devices employed on elevators with steel clamping jaws of rather small area for gripping the steel guide rails in the hatchway when the safety device was set by the action of the elevator in exceeding a predetermined limit of speed. However, it has been found in practice that when steel jaws are clamped against the steel guide rails by the setting of the safety device, that they tear and distort the guide rails and in some cases become welded to the rails.

Therefore, in many cases, it is necessary to employ the services of a mechanic to readjust and repair the clamping members and the guide rails after each application of the safety device. Until recently the necessity of repairing and readjusting the safety devices after each operation has not been a very serious matter because the safety devices have been used only on elevators in which one car is mounted in each shaft and the safety devices are operated only at long intervals. However, in elevator systems like the one set forth in the application for patent filed by H. D. James, February 17, 1928, Serial No. 255,049, and assigned to Westinghouse Electric & Manufacturing Company, wherein a plurality of cars are operated in each shaft, the action of the cars in approaching each too closely may cause the safety devices to be set and released many times each day. In such systems, it is practically necessary to employ safety devices that will not require the services of a mechanic after each application.

It is, therefore, an object of my invention to provide a safety device for elevators that will not tear or distort the guide rails or become welded thereto when it is operated.

Another object of my invention is to provide a safety device having such inherent characteristics as to cause it to grip the guide rails with an increasing degree of friction while it is in operation.

A further object of my invention is to provide a safety device that shall, upon being actuated, first apply a braking effect to the car and then a gripping action sufficient to stop the car and hold it at the point at which it is stopped.

It is also an object of my invention to provide a safety device that shall be simple and efficient in operation and adapted for ready and economical manufacture and installation.

Other objects of the invention will, in part, be obvious and will, in part, appear hereinafter.

For an illustration of one of the many forms my invention may take, reference may be had to the accompanying drawings, in which Figure 1 is a plan view, partly broken away, of a safety device embodying my invention.

Figure 2:
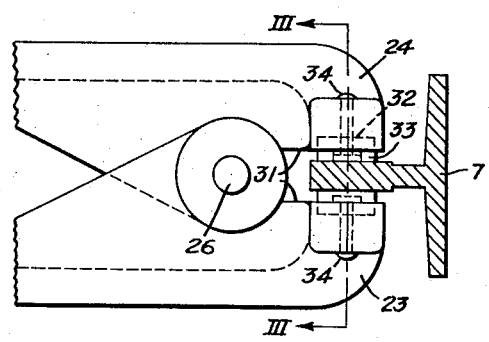
Figure 3:
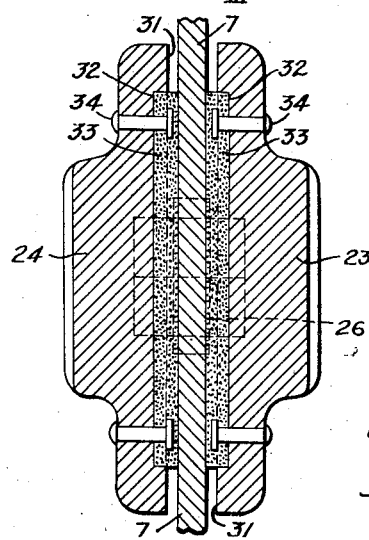

Fig. 2 is an enlarged plan view of one pair of the gripping jaws embodied in the safety device shown in Fig. 1, and Fig. 3 is a view, taken on line 111—111 of Fig. 2.

In the embodiment of my invention as shown in the drawings, I have provided a main frame 1 for supporting the various parts of the safety device. The frame 1 comprises a pair of parallel side members 2 and 3 that are spaced apart and retained in position by a pair of end cross members 4 and 5, and is adapted to be secured to the under side of an elevator car in such position as to extend across the elevator shaft between a pair of guide rails 6 and 7.

Mounted in suitable brackets on one side of the frame 1 are sheaves 8 and 9 over which extends a safety cable 10. The outer end of the safety cable 10 is disposed to be secured to the usual governor cable, in a manner well known in the elevator art, which cable is controlled by a suitable speed governor (not shown), while its inner end is wound around a spiral groove on the outer surface of, and is secured to, a safety drum 11 that is mounted on a pair of cross members 12 and 13 in the central part of the frame 1.

The safety drum 11 is provided with a right and left-hand screw threaded central aperture 14 for receiving the inner ends of a pair of aligned shafts 15 and 16 which are provided with cooperating right and left-hand screw threads. On the outer ends of the shafts 15 and 16 are mounted cam members 17 and 18 that are respectively disposed between the rear arms 19 and 20 and 21 and 22 of two pairs of cooperating clamping jaws 23 and 24 that are pivotally mounted, by means of bolts 25 and 26, on the respective ends of the frame 1. A plurality of rollers 27, 28, 29 and 30 are mounted in the ends of the arms 19 and 20 and 21 and 22 for engaging the cam members 17 and 18 for the purpose of reducing the friction therebetween when the cams are moved by the shafts 15 and 16 to close the clamping jaws.

The clamping jaws 23 and 24 are constructed with enlarged transverse gripping portions having rectangular faces 31 adapted to be disposed in parallel relation to the bearing surfaces of the guide rails 6 and 7, thereby providing relatively large areas of contact between the clamping jaws and the guide rails when the safety device is actuated.

In order to prevent the gripping portions of the jaws 23 and 24 from tearing and distorting the guide rails and at the same time insure such an amount of friction between the jaws and the guide rails when the safety device is actuated as will first apply a braking action to the car and then bring it to a stop and hold it at the point at which it is stopped, each of the gripping portions is provided with a recess 32 in which a lining embodying a suitable friction material is secured by means of a plurality of rivets 34. While any suitable lining having a coefficient of friction higher than that of steel may be employed, I prefer to use a lining embodying a large proportion of asbestos fibre and one in which the coefficient of friction increases with increase in temperature, such as is commonly employed in connection with automobile brakes.

It is to be noted that should the lining 33 become worn to such an extent as to become ineffective, the area of metallic jaws 31 upon which it is mounted would remain effective to grip the guide rails and stop the car, in case the safety device were actuated at such a time and should have such area as will effectively stop the car when only the coefficient of friction of metallic contact is utilized.

The operation of the safety device is as follows: Assuming that the safety device is actuated by the falling of the car, then the safety cable 10 is pulled away from the safety drum 11 by the speed governor (not shown). The movement of the safety cable rotates the drum, which, by reason of its screw-threaded engagement with the shafts 15 and 16, pulls them inwardly and causes the cam members 17 and 18 thereon to spread apart the rearwardly extending arms 19 and 20 and 21 and 22 on the two pairs of clamping jaws 23 and 24. The spreading of the arms causes the clamping jaws to close and engage the guide rails 6 and 7. Inasmuch as the enlarged gripping portions of the jaws are lined with a material having a coefficient of friction greater than that of steel, they will immediately take hold of the rails with a low retarding action that will increase rapidly as the pressure increases until the car is brought to a stop. In this manner the safety jaws first act as brakes to slow down the car and then as safety gripping devices to stop the car and hold it.

It will therefore be seen that I have provided an improved device that is safe and efficient in operation in which the effective braking force increases in advance of increase in pressure and which may be frequently applied without requiring the services of a mechanic after each application to the guide rails.

I claim as my invention:

1. In a safety device for elevator cars operating between guide rails, a safety-braking device carried by the car comprising a pair of rail-gripping jaws mounted in associated relation to each guide rail and having enlarged gripping faces, a recess provided in the gripping face of each jaw, a fibrous lining disposed in each recess for frictional engagement with the rails in the normal operation of the safety device, the unrecessed unlined portion of the rail-gripping faces having an area suitable for frictional engagement of the metal with the rail, whereby the device may still be operated in the usual manner if the lining wears out and is not replaced, and means for moving the jaws into frictional engagement with the rails.

2. In a safety device for elevator cars operating between guide rails, a safety-braking device carried by the car comprising a pair of rail-gripping jaws mounted in associated relation to each guide rail and having enlarged rail-gripping faces, a recess provided in a portion of the gripping face of each jaw, brake lining secured in each recess whereby the frictional engagement with the rail is normally applied, the areas of the recessed and the unrecessed portions of the gripping faces being respectively selected for the most effective braking whether the rail-gripping surface is lined or unlined, and means for moving the jaws into frictional engagement with the rails.

In testimony whereof, I have hereunto subscribed my name this 19th day of July, 1928.

GUSTAF A. HALFVARSON.